United States Patent
Morand et al.

(10) Patent No.: US 7,448,075 B2
(45) Date of Patent: Nov. 4, 2008

(54) METHOD AND A SYSTEM FOR AUTHENTICATING A USER AT A NETWORK ACCESS WHILE THE USER IS MAKING A CONNECTION TO THE INTERNET

(75) Inventors: Lionel Morand, Malakoff (FR); Frederic Delmond, Paris (FR); Estelle Transy, Issy les Moulineaux (FR); Celine Carpy, Le Plessis Robinson (FR)

(73) Assignee: France Telecom, Paris (FR)

( * ) Notice: Subject to any disclaimer, the term of this patent is extended or adjusted under 35 U.S.C. 154(b) by 786 days.

(21) Appl. No.: 10/771,422

(22) Filed: Feb. 3, 2004

(65) Prior Publication Data

US 2005/0039050 A1 Feb. 17, 2005

(30) Foreign Application Priority Data

Feb. 10, 2003 (FR) .................................. 03 01566

(51) Int. Cl.
*H04L 9/32* (2006.01)
*G06F 7/04* (2006.01)
*G06K 9/00* (2006.01)

(52) U.S. Cl. ............................... 726/7; 726/8; 713/153; 713/155

(58) Field of Classification Search ...................... 726/4, 726/7, 8; 713/153, 155
See application file for complete search history.

(56) References Cited

U.S. PATENT DOCUMENTS

| | | | | |
|---|---|---|---|---|
| 6,032,260 A * | 2/2000 | Sasmazel et al. | ............... | 726/10 |
| 6,108,789 A * | 8/2000 | Dancs et al. | ................... | 726/9 |
| 6,466,571 B1 * | 10/2002 | Dynarski et al. | ............ | 370/352 |
| 6,910,074 B1 * | 6/2005 | Amin et al. | ................. | 709/227 |
| 6,970,848 B2 * | 11/2005 | Osaka et al. | ................... | 705/51 |
| 7,188,360 B2 * | 3/2007 | Gerdes et al. | ................... | 726/4 |
| 2001/0037466 A1 * | 11/2001 | Fukutake et al. | ............ | 713/201 |
| 2002/0194334 A1 * | 12/2002 | Focant et al. | ................. | 709/225 |

FOREIGN PATENT DOCUMENTS

| | | |
|---|---|---|
| EP | 1 251 672 A1 | 10/2002 |
| WO | WO 01/45352 A2 | 12/2000 |
| WO | WO 02/86718 A1 | 4/2002 |

* cited by examiner

*Primary Examiner*—Nasser Moazzami
*Assistant Examiner*—David García Cervetti
(74) *Attorney, Agent, or Firm*—Bachman & LaPoint, P.C.

(57) ABSTRACT

The method consists in: a user terminal issuing an access request to an access or IP service provider, the request containing user identification and authentication data with the provider and with an access and IP transport network operator, the access request being transmitted via the access network to an authentication server of the access or IP service provider; previously transmitting the access request to an authentication server of the network operator; the authentication server performing a procedure to authenticate the user on the basis of user identification data with the provider; and transmitting a response message to the user terminal, which response message contains the results of the user authentication by the authentication servers.

11 Claims, 2 Drawing Sheets

METHOD AND A SYSTEM FOR AUTHENTICATING A USER AT A NETWORK ACCESS WHILE THE USER IS MAKING A CONNECTION TO THE INTERNET

BACKGROUND OF THE INVENTION

The present invention relates to providing services based on Internet protocol (IP) transport, such as making a connection to the Internet or making a telephone call over IP.

At present, such services are provided by an access network/IP transport operators (ANO/ITO) collecting the IP traffic generated by users from various access networks (public switched telephone network (PSTN), integrated services digital network (ISDN), digital subscriber line (DSL) networks, etc.) and concentrating the traffic into an IP stream. Such collected and concentrated IP traffic is subsequently delivered in a closed model to one or more delivery points of the network of an Internet access provider (IAP) or of an IP service provider (ISP) selected by the user. In an open model, the IP traffic may be forwarded directly in a transport network as a function of the IP addresses of the destinations. In the closed model, all of the collected traffic is generally transmitted to the Internet access provider or IP service provider by using a tunnel between an IP gateway and the network of the Internet access provider or the IP service provider, where the IP gateway is, for example, of the network access server (NAS) type or of the broadband access server (BAS) type. Accompanying FIG. 1 shows the open model.

In this figure, the collecting network collects IP traffic at local level. This network comprises various types of IP gateway 3, 4 providing interfaces with existing access networks 1, 2. The low data rate gateways 3, e.g. of the NAS type, provide an interface with networks 1 of the PTSN and ISDN types, while high data rate gateways 4, e.g. of the BAS type, provide an interface for asymmetric digital subscriber line (ADSL) access via an asynchronous transfer mode (ATM) network.

The IP traffic from terminals 11 heading to IP gateways 3, 4 is encapsulated in frames complying with the point-to-point protocol (PPP). At the beginning of connection, this protocol serves to convey the information needed for configuring the IP connection and authenticating the user terminal. This information is subsequently received by the IP gateways 3, 4 which encapsulate it in messages complying with an authentication, authorization, and accounting (AAA) protocol such as Remote Authentication Dial-In User Service (RADIUS) or Diameter, and then transmit it to an authentication proxy server 9 controlled by the operator of the access and IP transport networks. The proxy server 9 is designed to direct such authentication requests through an IP transport network 5 to an AAA server controlled by the Internet access provider 6, 7 or the IP service provider 8 requested by the user. The AAA server authenticates the user and authorizes the user to open a PPP session. At the end of an IP connection, the IP gateways 3, 4 issue a ticket containing all of the information needed for billing the user.

In that architecture (FIG. 1), the users of the IP transport network are authenticated solely by the AAA server of the Internet access or service provider 6, 7, 8 on the basis of information such as an identifier of the form "IAPid@IAPdomain" together with a password, which identifier and password are allocated by the access or service provider. As a general rule, operators (ANO/ITO) of access/IP transport networks cannot use such authentication information to identify the user, given that the information is managed by a different administrative domain. As a result the proxy server 9 cannot verify the information and therefore can do no more than forward it to the access or service provider requested by the user in order to obtain authentication of the user from the provider.

In addition, the procedures presently implemented for establishing an IP/PPP connection via access networks 1, 2 such as PSDN, ISDN, or ADSL, do not enable the user to be authenticated at access network level.

Nevertheless there exists a need for the operators of access/ IP transport networks to identify users in order to offer personalized services to users, which services are of high added value at access network level, while also providing continuity in the present collection service. As an example of such services, mention can be made of managing the mobility of roaming users, personalizing access as a function of preferences predefined by the user, or providing single multi-access billing which consists in combining on a single bill all of the accesses made by one particular user regardless of the terminal or access point used.

SUMMARY OF THE INVENTION

An object of the present invention is to eliminate those drawbacks, while proposing an architecture which complies with present procedures for setting up a PPP/IP connection. This object is achieved by providing a method enabling an access and IP transport network operator to authenticate a user while an attempt is being made to set up a connection to an IP service or Internet access provider, the method consisting in:

a user terminal issuing an access request to an access or IP service provider, the request containing user identification and authentication data, said access request being transmitted via an access network and an IP transport network to an authentication server of the access or IP service provider;

the authentication server performing a procedure for authenticating the user on the basis of identification and authentication data contained in the request; and transmitting a response message to the user terminal, the response message containing the result of user authentication by the authentication server.

According to the invention, this method further comprises the steps consisting in:

previously inserting in the access request user identification and authentication data with the access network and IP transport operator;

transmitting the access request transiting through the IP transport network to an authentication server of the access and IP transport network operator; and the authentication server of the access and IP transport network operator performing a procedure for authenticating the user on the basis of the user identification and authentication data with the access and IP transport network operator, as contained in the access request.

Preferably, the step of inserting user identification and authentication data with the access and IP transport network operator in the access request is optional, at the user's choice.

Advantageously, the method further comprises a step of inserting the result of user authentication by the authentication server of the access and IP transport network operator into the response message.

According to a feature of the invention, the method further comprises the steps of generating an access request not containing user identification and authentication data with the access and IP transport network operator, and transmitting said access request to the Internet access or IP service provider.

According to another feature of the invention, the method further comprises a step of inserting user profile data in the response message if the user is authenticated during the authentication procedure performed by the authentication server of the access and IP transport network operator.

Advantageously, the steps of authenticating the user by the authentication servers of the Internet or IP access service provider and of the access and IP transport network operator are performed one after the other.

Alternatively, the steps of authenticating the user by the authentication servers of the Internet or IP access service provider and of the access or IP transport network operator are triggered substantially simultaneously.

According to a feature of the invention, the identification and authentication data inserted in the access requests are of the form:

"IAPid|Nid|AUTH@IAPdomain, PW"

in which:

"IAPid" represents the user identifier with the access or IP service provider;

"Nid" represents the user identifier with the access and IP transport network operator;

"AUTH" represents user authentication data with the access and IP transport network operator;

"IAPdomain" represents the access or IP service provider identifier in the IP transport network; and "PW" represents an authentication password associated with the identifier "IAPid" of the user with the access or IP service provider.

The invention also provides a system enabling an operator of access and IP transport networks to authenticate users attempting to set up a connection to an Internet access or IP service provider, the system comprising:

access networks to which user terminals are connected;

at least one IP transport network to which Internet access and IP service providers are connected;

IP gateways connecting the access networks and the IP transport networks;

means provided in each user terminal to issue access requests to one of the access or IP service providers, said requests containing user identification and authentication data with one of the access or IP service providers; and at least one authentication server for each of the access or IP service providers and designed to identify and authenticate users as a function of identification and authentication data contained in the access requests received by the access or IP service provider.

According to the invention, each user terminal includes means for inserting into each access request it issues user identification and authentication data with an access and IP transport network operator, the system further including an access controller and an authentication server of the access and IP transport network operator, the access controller including means for receiving all of the access requests coming from user terminals and transmitted over the IP transport network, and means for extracting from each of the access requests the user identification and authentication data with the access and IP transport network operator and for transmitting said data to the authentication server of the access and IP transport network operator, the authentication server of the access and IP transport network operator including means for performing an authentication procedure on the basis of identification and authentication data received from the access controller.

According to a feature of the invention, the access controller includes means for inserting the result of the procedure for authenticating the user as performed by the authentication server of the access and IP transport network operator into response messages replying to the access request and issued by the access or IP service providers.

According to another feature of the invention, it further includes a database containing user identification data of the access and IP transport network operator, and profile data of said users, said database being accessible to the authentication server of the access and IP transport network operator and/or of the access controller.

Advantageously, the access controller is a RADIUS proxy server and the authentication server is a RADIUS server.

BRIEF DESCRIPTION OF THE DRAWINGS

A preferred embodiment of the invention is described below by way of non-limiting example and with reference to the accompanying drawings, in which.

DETAILED DESCRIPTION OF THE PREFERRED EMBODIMENT(S)

Figure 1:
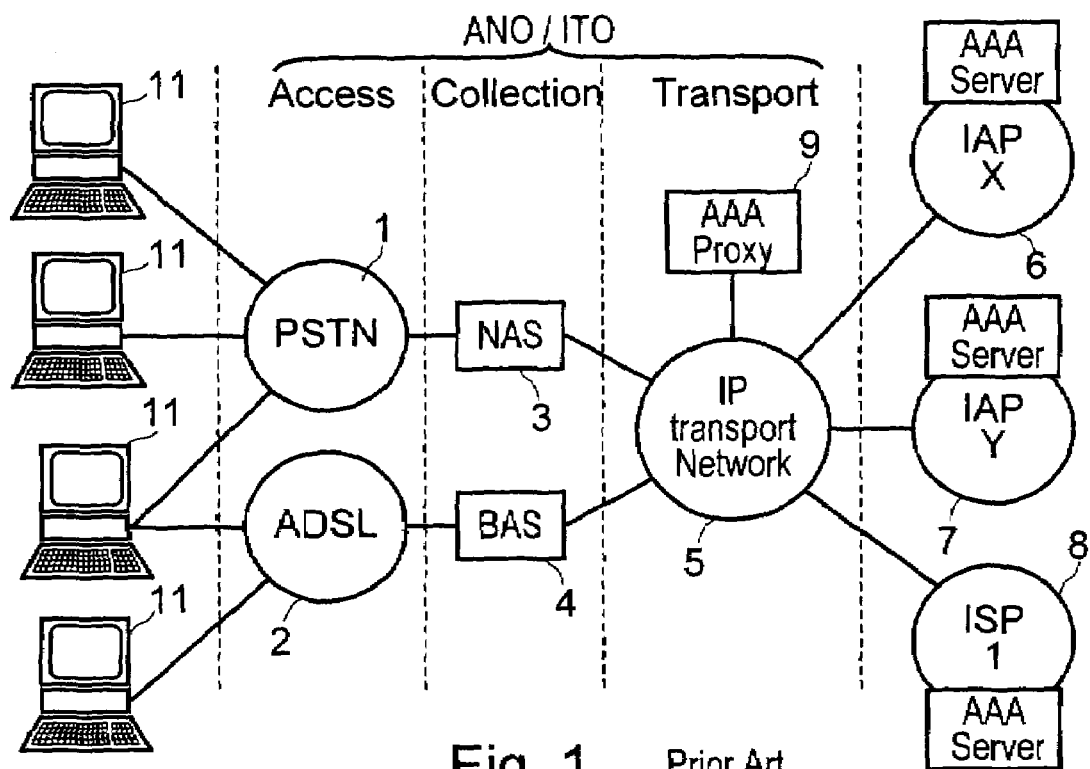
FIG. 1 is a diagram showing the architecture of a prior art system for providing services based on IP transport.
Figure 2:
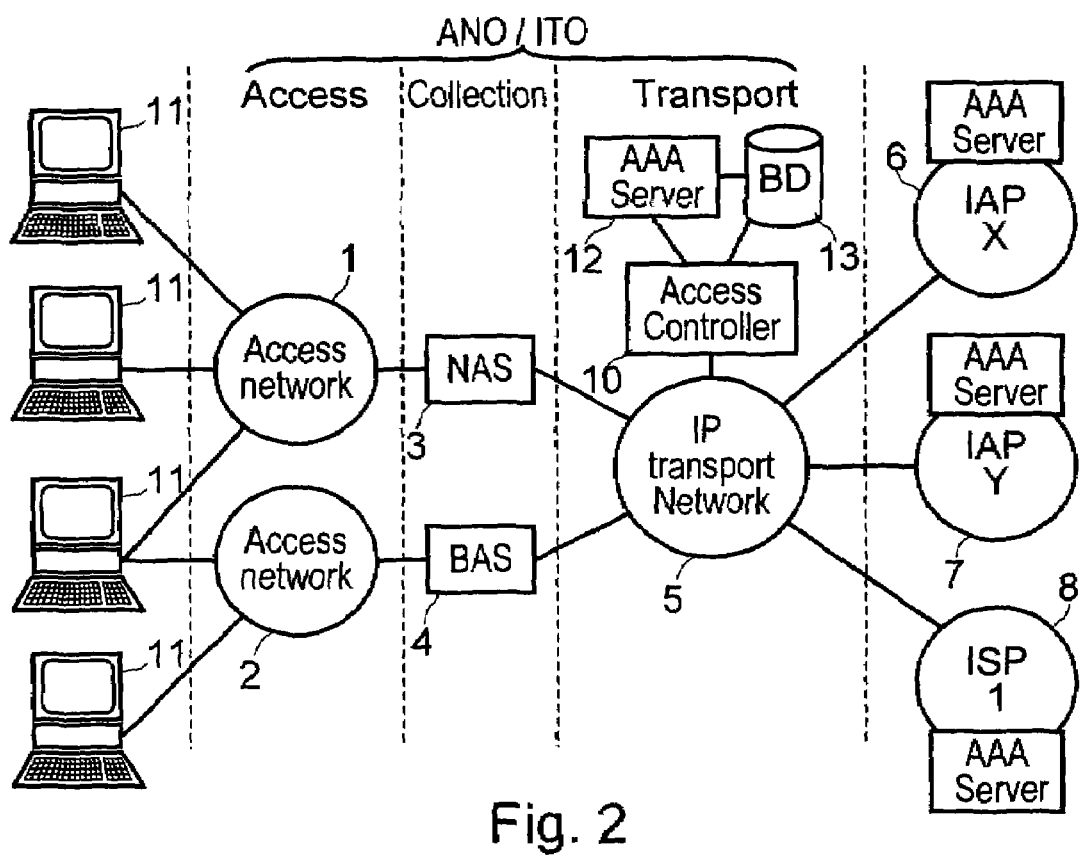
FIG. 2 is a diagram showing the architecture of a system of the invention for providing services based on IP transport.

The system architecture shown in FIG. 2 comprises access networks 1, 2 having user terminals 11 connected thereto. These access networks 1, 2 provide the terminals 11 with access to an IP transport network 5 via respective IP gateways 3, 4 adapted to the access networks. The entity comprising the access networks, the gateways, and the IP transport networks is implemented by an access network/IP transport network operator (ANO/ITO).

The IP transport network 5 enables users to access an Internet access provider 6, 7 or an IP service provider 8. For this purpose, the system of the invention comprises an access controller 10 connected to the IP transport network 5 and to which the IP gateways 3, 4 transmit access requests issued by the terminals 11.

The system of the invention also comprises an authentication server AAA 12 connected to the access controller 10, and a user database 13 accessible by the authentication server 12 and possibly by the access controller 10, said database containing identification and profile data about the users with respect to the ANO/ITO operator.

The access controller 10 is designed to receive all access requests to an access or service provider 6, 7, 8 that are issued by users over the networks 1, 2, these requests being transmitted to the access controller by the gateways 3, 4 corresponding to the access network used, prior to being transmitted to the access or service provider 6, 7, 8 selected by the user. The authentication server 12 is designed to perform an authentication procedure for each access request received, this procedure making use of the identification and authentication information stored in the database 13.

A request for access to an access or service provider as issued by a user comprises a request to authorize the opening of a PPP session. On receiving such a request, the access controller 10 asks the authentication server 12 to authenticate the user, the server then starting the authentication procedure. In conventional manner, the access controller also asks the access or service provider 6, 7, or 8 to authenticate the user. When the authentication server 12 and the access or service provider have sent their responses concerning authentication of the user, the access controller issues the user terminal 11 with a response to the request for access authorization, the response depending on the authentication responses that have been received.

It should be observed that the user terminal inserting a request to authorize the opening of a PPP session may be optional, being a user choice, with authentication of the user by the ANO/ITO operator being needed only when the user seeks to benefit from personalized services in the access network or the IP transport network. If authentication with the ANO/ITO operator fails, the access controller 10 follows the procedure for managing access rights that is recommended by the ANO/ITO operator.

When a request received by the access controller 10 does not include information identifying the user with the ANO/ITO operator, the request is retransmitted in conventional manner to the requested access or IP service provider, i.e. without being processed by the access controller 10.

Figure 3:
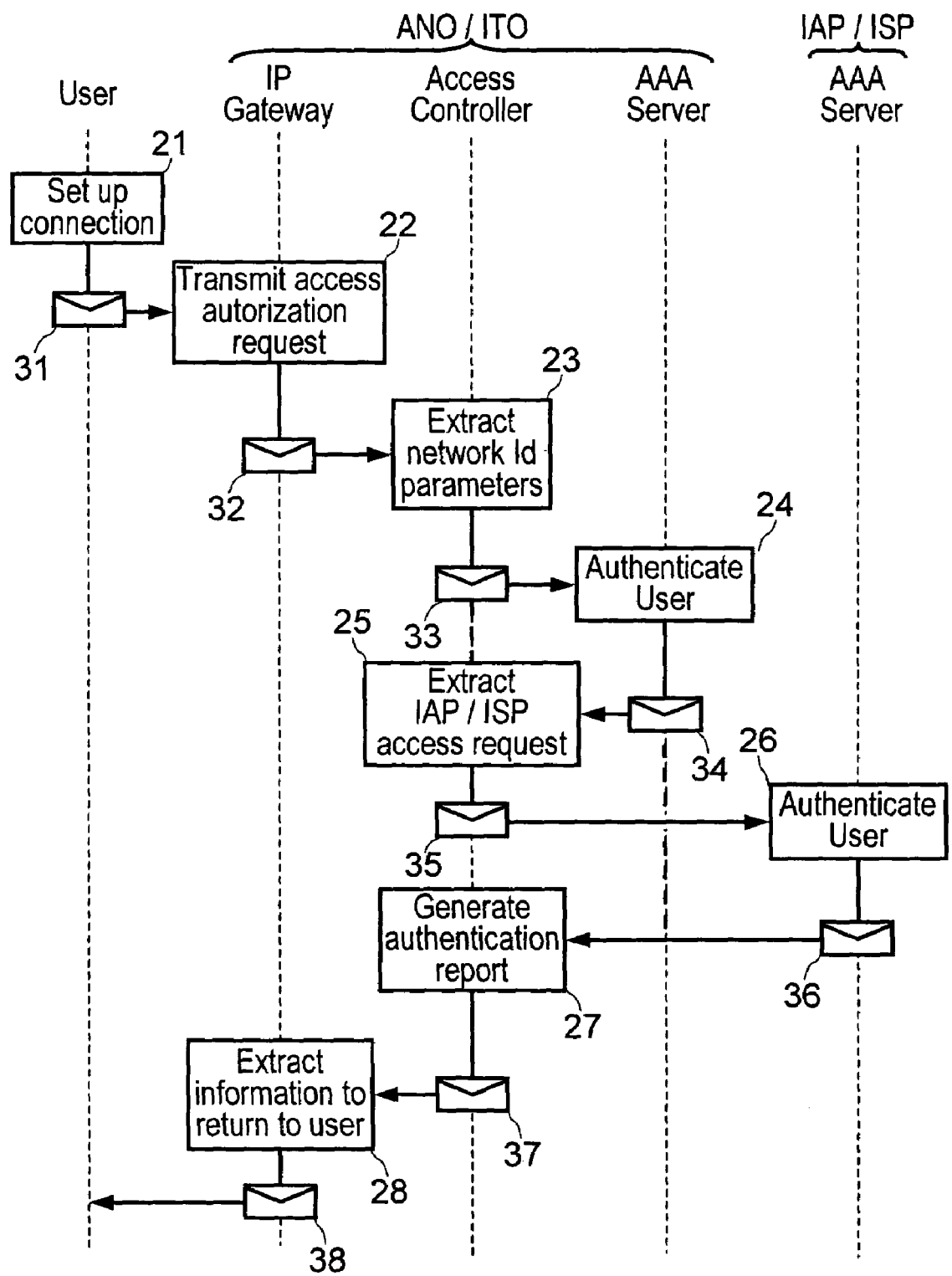
FIG. 3 is a diagram showing the sequencing of the procedures performed and the messages exchanged in the system shown in FIG. 2.

The sequencing of the messages exchanged and the authentication procedures is shown in the diagram of FIG. 3.

To access the Internet or an IP service, the user terminal 11 executes a procedure 21 for setting up a PPP connection, the procedure comprising issuing an access request message 31 containing user identification and authentication information for the Internet access provider 6 or 7 or the service provider 8. The identification information which may be of the form "IAPid@IAPdomain" is associated with authentication information such as a password, with "IAPid" enabling the user to be identified uniquely with the access or service provider. In addition, in the invention, the access request message 31 further comprises user identification and authentication information for the user's access and IP transport operator ANO/ITO.

The access request message 31 is sent by the terminal 11 to the corresponding IP gateway 3, 4. On receiving such a message, the IP gateway performs a procedure 22 consisting in encapsulating the message 31 that is has received in a message 32 requesting authorization to access the IP network. This message is transmitted by the IP gateway to the access controller 10 of the access network and IP transport network operator ANO/ITO.

On receiving the message 23, the access controller 10 performs a procedure 23 consisting in extracting the information identifying and authenticating the user with the access and IP transport operator from the message 32 and in transmitting said information to the authentication server 12 in the form of a message 33.

On receiving the message 33, the authentication server 12 starts a procedure 24 for authenticating the user, which procedure consists in verifying that the received identification and authentication information does indeed correspond to the information that has been stored for a user in the database. The authentication server 12 then transmits a message 34 reporting this verification to the access controller 10.

During the procedure 23 or in another procedure 25 initiated on receiving the message 34, the access controller 10 extracts from the access authorization request message 33 the request 35 for access to the access or service provider 6, 7, or 8 and transmits the request to the provider.

On receiving the request 35, the access or service provider initiates a procedure 26 which consists in verifying whether the user is authorized to access the Internet or the IP service, given the identifier and the password contained in the request, and in returning a message 36 reporting authentication to the access controller 10.

On receiving the two messages 34 and 36 reporting user authentication and coming from the authentication server 12 and from the access or IP service provider 6, 7, or 8, the access controller 10 performs a procedure 27 that generates a message 37 in response to the access request issued by the user, and transmits this response message to the IP gateway 3, 4.

This response message 27 contains the authentication report issued by the access or IP service provider 6, 7, or 8, and possibly also the authentication report issued by the authentication server 12.

If the authentication report from the authentication server 12 indicates success, it may contain information concerning the profile of the services to which the user subscribes with the network operator ANO/ITO, which information may be stored, for example, in the database 13 in association with the user identifier. Alternatively, this profile information may be found in the database 13 by the access controller 10, providing the user has previously been authenticated by the authentication server 12.

It should be observed that the authentication procedures 24 and 26 performed by the server 12 and by the access or service provider 6, 7, or 8 may be performed simultaneously or else sequentially in any order.

On receiving the response message 27, the IP gateway 3, 4 performs a procedure 28 consisting in extracting from said response message information for returning to the user, and possibly also in making use of the profile information contained in said message and then transmitting to the user terminal a message 38 containing all of the extracted information that is destined for the user.

By means of these dispositions, the network operator ANO/ITO can adapt the connection and transmission services it provides to its users as a function of their identities, for example by offering a minimum service to unrecognized users.

The invention as described above can be implemented by using authentication protocols such as those used in connections based on the PPP protocol, i.e. the password authentication protocol (PAP) and the RADIUS protocol.

The access controller 10 can thus be developed on the basis of a RADIUS proxy server and the authentication server 12 on the basis of a RADIUS server.

The PAP protocol enables the user to be authenticated with the user's own access or IP service provider by transmitting an identifier thereto in the form "IAPid@IAPdomain", and inputting a password.

In order to transmit the information needed by the access controller 10 to authenticate the user, provision can be made to insert the user's network identifier Nid and the associated authentication information AUTH in the user's identifier with the access provider as follows:

"IAPid|Nid|AUTH@IAPdomain"

The message 31 corresponds to the message "PAP_Authenticate_Request" and contains the above identification string and the authentication password (PW) with the access or service provider as supplied by the user.

The message 32 generated by the procedure 2 is a RADIUS "Access-Request" message having the following attributes in particular:

UserName="""IAPid|Nid|AUTH@IAPdomain"

UserPassword="PW"

The procedure 23 consists in extracting from the "User-Name" attribute of the message 32 the portion "Nid|AUTH" portion needed by the operator ANO/ITO to identify the user, and in inserting the following attributes in the message 33 which is of the RADIUS "Access-Request" type:

UserName="Nid"

UserPassword="AUTH"

The authentication procedure 24 performed by the RADIUS server 12 consists in looking for the identifier "Nid" in the database 13 to see whether it is associated therein with the password "AUTH", and in issuing a report message 34 of the RADIUS "Access-Accept" or "Access-Reject" message type depending on the result of the authentication.

The authentication server of the access or service provider 6, 7, or 8 is likewise a RADIUS server, and the message 35 is likewise of the RADIUS "Access-Request" message type, containing the following attributes:

UserName="IAPid"

UserPassword="PW"

The report message 36 is likewise a message of the RADIUS "Access-Accept" or "Access-Reject" type depending on the result of the authentication.

In order to generate the message 37, the procedure 27 consists, for example, in inserting in the message 36 a "Reply-Message" attribute containing the result of the authentication performed by the authentication server 12, e.g. "success" or "fail".

The message 38 generated by the gateway 3, 4 during the procedure 28 is a message of the "PAP_Authenticate_Ack" type when access is accepted, or of the "PAP_Authenticate_Nack" type when access is refused, and it contains the content of the "ReplyMessage" attribute of the message 36.

Naturally, any other authentication protocol such as Diameter can be used by the invention to authenticate users with various services.

What is claimed is:

1. An authentication method for authenticating a user by an access network operator (ANO) and an IP transport network operator (ITO) during an attempt to set up a connection to an Internet access provider or to an IP service provider, the method comprising the steps of:
    using a user terminal to issue an access request to an Internet access provider or to an IP service provider, the request containing: first user identification (Nid) and authentication (AUTH) data with respect to the access network operator (ANO) and the IP transport network operator (ITO); and second user identification (IAPid) and authentication data with respect to the Internet access provider or the IP service provider;
    using an access controller to receive said access request;
    using said access controller to extract said first identification (Nid) and authentication (AUTH) data from said access request and transmitting said first identification and authentication data to an authentication server of the access network operator (ANO) and IP transport network operator (ITO), said authentication server authenticating the user on the basis of said first user identification and authentication data;
    using the access controller to extract the second identification (IAPid) and authentication (PW) data from said access request and transmitting said second identification and authentication data to an authentication server of the Internet access provider or IP service provider;
    authenticating the user on the basis of said second user identification and authentication data using the authentication server;
    transmitting a response message to the user terminal, via the access controller, the response message containing the result of said user authentication by the authentication server of the Internet access provider of IP service provider.

2. A method according to claim 1, further comprising a step of inserting the result of user authentication by the authentication server of the Internet access network operator and IP transport network operator into the response message.

3. A method according to claim 1, further comprising a step of inserting user profile data in the response message if the user is authenticated during the authentication procedure performed by the authentication server of the Internet access network operator and IP transport network operator.

4. A method according to claim 1, wherein the steps of authenticating the user by the authentication servers of the Internet access provider or IP service provider and by the authentication server of the Internet access network operator and IP transport network operator are performed one after the other.

5. A method according to claim 1, wherein the steps of authenticating the user by the authentication servers of the Internet access provider or IP service provider and by the authentication server of the access or IP transport network operator are triggered substantially simultaneously.

6. A method according to claim 1, wherein the first and second identification and authentication data inserted in the access requests are of the form:

IAPid|Nid|AUTH@IAPdomain,PW in which:
    "IAPid" represents the user identification data with respect to the Internet access provider or to the IP service provider;
    "Nid" represents the user identification data with respect to the access network operator (ANO) and IP transport network operator (ITO);
    "AUTH" represents user authentication data with respect to the access network operator and IP transport network operator;
    "IAPdomain" represents the Internet access provider or IP service provider identifier in the IP transport network; and
    "PW" represents an authentication password associated with the identification data "IAPid" of the user with respect to the Internet access provider or IP service provider.

7. A system for authenticating users by an access network operator (ANO) and IP transport network operator (ITO) during an attempt to set up a connection to an Internet access provider or IP service provider, the system comprising:
    access networks to which user terminals are connected;
    at least one IP transport network to which Internet access and IP service providers are connected;
    IP gateways connecting the access networks to the IP transport network;
    means provided in each user terminal for issuing access requests to one of the Internet access or IP service providers, said request containing: first user identification (Nid) and authentication (AUTH) data with respect to the access network operator (ANO) and IP transport network operator ITO); and second user identification (IAPid) and authentication data with respect to one of the Internet access or IP service providers;

at least one authentication server, for each of the Internet access or IP service providers, designed to identify and authenticate users as a function of said second identification and authentication data an authentication server of the access network operator (ANO) and IP transport network operator (ITO), an access controller including:

means for receiving all of the access requests coming from user terminals and transmitted over the IP transport network, and means for extracting from each of the access requests the first user identification and authentication data; and for transmitting said data to the authentication server of the access network operator and IP transport network operator;

means for extracting each of the access requests the second user identification and authentication data and for transmitting said data to the authentication server of the access network and IP transport network operator; and the authentication server of the access network and IP transport network operator including means for authenticating the user on the basis of said first identification and authentication data received from the access controller.

8. A system according to claim 7, wherein the access controller includes means for inserting the result of the procedure for authenticating the user as performed by the authentication server of the access and IP transport network operator into response messages replying to the access request and issued by the access or IP service providers.

9. A system according to claim 7, further including a database containing user identification data of the access and IP transport network operator, and profile data of said users, said database being accessible to the authentication server of the access and IP transport network operator and/or of the access controller.

10. A system according to claim 7, wherein the access controller is a RADIUS proxy server and the authentication server is a RADIUS server.

11. An access controller in a system for authenticating users by an access network operator (ANO) and IP transport network operator (ITO) during an attempt to set up a connection to an Internet access provider or IP service provider, said access controller comprising:

means for receiving an access request coming from a user terminal, said request containing: first user identification (Nid) and authentication (AUTH) data with respect to the access network operator (ANO) and the IP transport network operator (ITO); and second user identification (IAPid) and authentication data with respect to the Internet access provider or the IP service provider;

means for extracting the first identification (Nid) and authentication (AUTH) data from said request;

means for transmitting said first identification and authentication data to an authentication server of the Internet access network operator (ANO) and IP transport network Operator (ITO);

means for extracting the second identification and authentication data from said message;

means for transmitting said second identification and authentication data to an authentication server (AAA) of the Internet access provider or IP service provider; and means for transmitting a response message to the user terminal, the response message containing the result of said user authentication by the authentication server (AAA) of the Internet access provider or IP service provider.

* * * * *